No. 722,046. PATENTED MAR. 3, 1903.
E. RIEGER.
FASTENING DEVICE FOR SCREWS.
APPLICATION FILED DEC. 6, 1902.
NO MODEL.
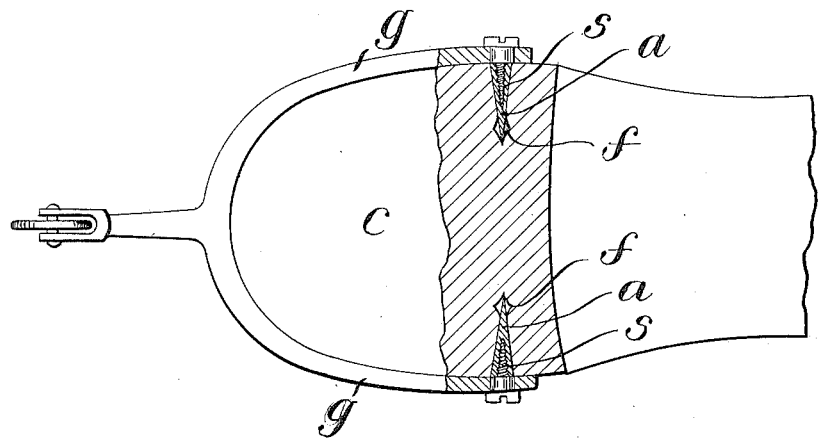
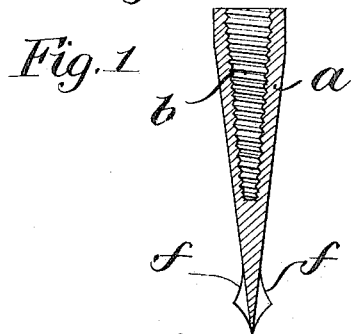
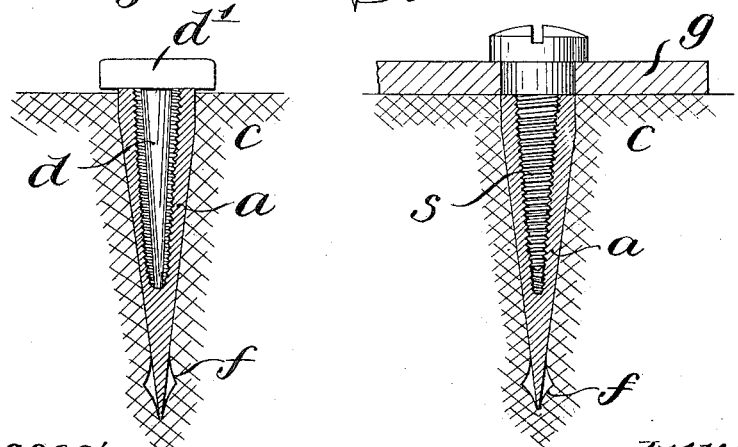
Witnesses:
Inventor
Erwin Rieger
By James L. Norris.
Atty.

UNITED STATES PATENT OFFICE.

ERWIN RIEGER, OF VIENNA, AUSTRIA-HUNGARY.

FASTENING DEVICE FOR SCREWS.

SPECIFICATION forming part of Letters Patent No. 722,046, dated March 3, 1903.

Application filed December 6, 1902. Serial No. 134,153. (No model.)

*To all whom it may concern:*

Be it known that I, ERWIN RIEGER, a subject of the Emperor of Austria-Hungary, residing at Vienna, in the Province of Lower Austria, in the Empire of Austria-Hungary, have invented certain new and useful Improvements in Fastening Devices for Screws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

It is a well-known fact that whenever som object has to be fastened by means of screws on a support made of a material of a comparatively small power of resistance—such as wood, leather, and the like—and in case the screwed-on object has to be repeatedly removed from its support and fixed onto it again the obvious inconvenience always occurs that in consequence of the repeated screwing in and unscrewing of the screw, even when the latter is of a conical shape, the female screw-thread in the non-resisting material of the support is worn out or damaged to such a degree that the screw loses its hold and turns loosely without gripping.

The present invention relates to a device by means of which the above drawback is entirely avoided and a firm and secure gripping of the screw is obtained, even when the support is made of a material of very little resistance.

In order to prevent a damaging of the female screw-thread when the plug or pin is being driven into wood, leather, &c., this driving in of the plug or pin is effected with the aid of a spike, which bears upon the bottom of the recess or bore of the plug and always remains out of contact with the screw-thread.

In the accompanying drawings, Figure 1 shows the fastening-plug with conical female thread in longitudinal section. Fig. 2 shows the way of employment of a spike when the plug is being driven in. Fig. 3 represents the manner after which an object is fastened to its support by means of the improved fastening device. Fig. 4 represents the manner after which this device is employed for the fastening of spurs.

The fastening device consists of a metallic plug or pin $a$ of conical shape, having an interior recess $b$, which is preferably also of a conical shape and is provided with a female screw-thread. This plug is driven into the supporting-body $c$, (see Fig. 3,) which is made of a material of little resistance—such as wood, leather, and the like—and to which it is intended to affix the object by screwing. The driving in of the plug is preferably effected by means of a spike $d$, Fig. 2, which is made so thin that it does not touch the interior thread of the recess $b$. This spike $d$ bears with its lowermost extremity upon the bottom of the conical recess and, if desired, also with its head $d'$ upon the top end of the plug. When the plug has been driven in in the manner referred to, the spike is removed from the recess of the plug, the object $g$ is placed upon the support $c$, and the fastening-screw $s$, of a size corresponding to the recess of the plug, is screwed in. (See Figs. 3 and 4.)

In order to prevent the plug $a$ from rotating when the screw $s$ is being screwed in or unscrewed, and from thus becoming slack, the plug is provided at or near its point with projections or ribs $f$.

I claim—

1. The combination with a hollow internally-threaded bushing tapered from its upper toward its closed end and provided at said closed end with an enlargement, of a tapered screw adapted to fit the interiorly-threaded portion of said bushing, substantially as described.

2. The combination with an interiorly-threaded hollow bushing tapered from its open toward its closed end and provided at the latter portion with laterally-projecting spurs, and a tapered screw arranged to fit within said bushing, substantially as described.

In testimony that I claim the foregoing as my invention I have signed my name in presence of two subscribing witnesses.

ERWIN RIEGER.

Witnesses:
 JOSEF RUBRESCH,
 ALVESTO S. HOGUE.